United States Patent
Diab et al.

(10) Patent No.: US 9,065,736 B2
(45) Date of Patent: Jun. 23, 2015

(54) METHOD AND SYSTEM FOR COMPENSATED TIME STAMPING FOR TIME-SENSITIVE NETWORK COMMUNICATIONS

(71) Applicant: Broadcom Corporation, Irvine, CA (US)

(72) Inventors: Wael William Diab, San Francisco, CA (US); Howard Frazier, Pleasanton, CA (US)

(73) Assignee: BROADCOM CORPORATION, Irvine, CA (US)

( * ) Notice: Subject to any disclaimer, the term of this patent is extended or adjusted under 35 U.S.C. 154(b) by 180 days.

(21) Appl. No.: 13/647,597

(22) Filed: Oct. 9, 2012

(65) Prior Publication Data

US 2014/0098684 A1    Apr. 10, 2014

Related U.S. Application Data

(63) Continuation of application No. 12/480,648, filed on Jun. 8, 2009, now Pat. No. 8,295,312.

(51) Int. Cl.
*G01R 31/08* (2006.01)
*H04L 12/26* (2006.01)

(52) U.S. Cl.
CPC .......... *H04L 43/0858* (2013.01); *H04L 43/087* (2013.01); *H04L 43/106* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS 7,110,423 B1    9/2006  Sethuram et al.
8,295,312 B2 *  10/2012 Diab et al. .................... 370/519
(Continued)

FOREIGN PATENT DOCUMENTS

EP    1473870    11/2004
EP    1484876    12/2004
(Continued)

OTHER PUBLICATIONS

Teener, "Audio/Video Bridging for Home Networks," Jun. 1, 2007.
(Continued)

*Primary Examiner* — Jung-Jen Liu
(74) *Attorney, Agent, or Firm* — Foley & Lardner LLP; Christopher J. McKenna; Angela D. Murch

(57) ABSTRACT

Aspects of a method and system for compensated time stamping for time-sensitive network communications are provided. In this regard, one or more timestamps generated in an OSI layer above the physical layer may be adjusted based on parameters associated with an amount of time in which data traverses a PHY of the network device. Communications of the network device may be managed based on the adjusted one or more timestamps. The parameters may comprise one or more of: average ingress PHY traversal time, average egress PHY traversal time, variance of ingress PHY traversal time, and variance of egress PHY traversal time. One or more network links coupled to the network device may be characterized based on the one or more adjusted timestamps. The parameters may be stored in one or more registers within a PHY of the network device.

20 Claims, 7 Drawing Sheets

(56) References Cited

U.S. PATENT DOCUMENTS

| | | | |
|---|---|---|---|
| 8,385,333 B2 * | 2/2013 | Stanton et al. | 370/389 |
| 8,446,896 B2 * | 5/2013 | Bedrosian | 370/350 |
| 2005/0286564 A1 * | 12/2005 | Hatley et al. | 370/503 |
| 2006/0034295 A1 | 2/2006 | Cherukuri et al. | |
| 2006/0251129 A1 | 11/2006 | Morimura et al. | |
| 2007/0101043 A1 | 5/2007 | Herman | |
| 2007/0280239 A1 | 12/2007 | Lund | |
| 2008/0080562 A1 * | 4/2008 | Burch et al. | 370/503 |
| 2008/0089364 A1 * | 4/2008 | Barry et al. | 370/517 |
| 2008/0117938 A1 * | 5/2008 | Erich et al. | 370/503 |
| 2008/0225841 A1 | 9/2008 | Conway et al. | |
| 2008/0263247 A1 * | 10/2008 | Hauck | 710/118 |
| 2009/0164628 A1 | 6/2009 | Yeh et al. | |
| 2009/0175283 A1 | 7/2009 | Jan et al. | |
| 2009/0307751 A1 | 12/2009 | Lin et al. | |
| 2010/0103955 A1 | 4/2010 | Biederman et al. | |
| 2010/0241880 A1 | 9/2010 | Wertheimer et al. | |
| 2010/0262848 A1 | 10/2010 | Bobrek et al. | |
| 2010/0309932 A1 * | 12/2010 | Diab et al. | 370/503 |
| 2011/0087803 A1 * | 4/2011 | Sun et al. | 709/248 |
| 2011/0222560 A1 * | 9/2011 | Biederman et al. | 370/503 |
| 2013/0223248 A1 * | 8/2013 | Suzuki | 370/252 |

FOREIGN PATENT DOCUMENTS

| | | |
|---|---|---|
| EP | 1494407 | 1/2005 |
| GB | 2337672 | 11/1999 |
| WO | WO 00/31923 | 6/2000 |

OTHER PUBLICATIONS

Grow, "802.1 and Energy Efficient Ethernet," Sep. 11, 2007.
Bennett et al., "Energy Efficient Ethernet," Jul. 16, 2007.
Gupta et al., "Dynamic Ethernet Link Shutdown for Energy Conservation on Ethernet Links," 2007.
Diab, "Energy Efficient Ethernet and 802.1," Nov. 16, 2007.

\* cited by examiner

METHOD AND SYSTEM FOR COMPENSATED TIME STAMPING FOR TIME-SENSITIVE NETWORK COMMUNICATIONS

CROSS-REFERENCE TO RELATED APPLICATIONS/INCORPORATION BY REFERENCE

This application is a continuation of non-provisional patent application Ser. No. 12/480,648, filed Jun. 8, 2009. This patent application also makes reference to, U.S. patent application Ser. No. 12/480,658, filed on Jun. 8, 2009.

Each of the above stated applications is hereby incorporated herein by reference in its entirety.

FIELD OF THE INVENTION

Certain embodiments of the invention relate to networking. More specifically, certain embodiments of the invention relate to a method and system for compensated time stamping for time-sensitive network communications.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types, sizes for a variety of applications. In this regard, Ethernet networks are increasingly being utilized to carry, for example, voice, data, and multimedia. In this regard, people are relying more and more on the Internet and associated protocols such as Ethernet for the delivery of real-time and/or high quality content and/or information. However, delivery of such time-sensitive information creates a serious burden on networks and network designers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for method and system for compensated time stamping for time-sensitive network communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for compensated time stamping for time sensitive network communications. In various embodiments of the invention, one or more timestamps generated in an OSI layer above the physical layer may be adjusted based on parameters associated with an amount of time in which data traverses a PHY of the network device. Communications of the network device may be managed based on the adjusted one or more timestamps. The parameters may comprise one or more of: average ingress PHY traversal time, average egress PHY traversal time, variance of ingress PHY traversal time, and variance of egress PHY traversal time. One or both of the variance of egress PHY traversal time and the variance of ingress PHY traversal time may be based on PHY traversal time for different configurations of a PHY within the network device. One or both of the variance of egress PHY traversal time and the variance of ingress PHY traversal time may be determined based on process, temperature, and/or voltage variations. One or more network links coupled to the network device may be characterized based on the one or more adjusted timestamps. The parameters may be stored in one or more registers within a PHY of the network device. The one or more registers may be accessible via a management data input/output (MDIO) bus. The parameters may be determined and stored in the registers by a test and/or programming system. The one or more registers may be configured via an exchange of link layer discovery protocol data units. The parameters may be determined utilizing one or more counters within a PHY of the network device.

Figure 1A:
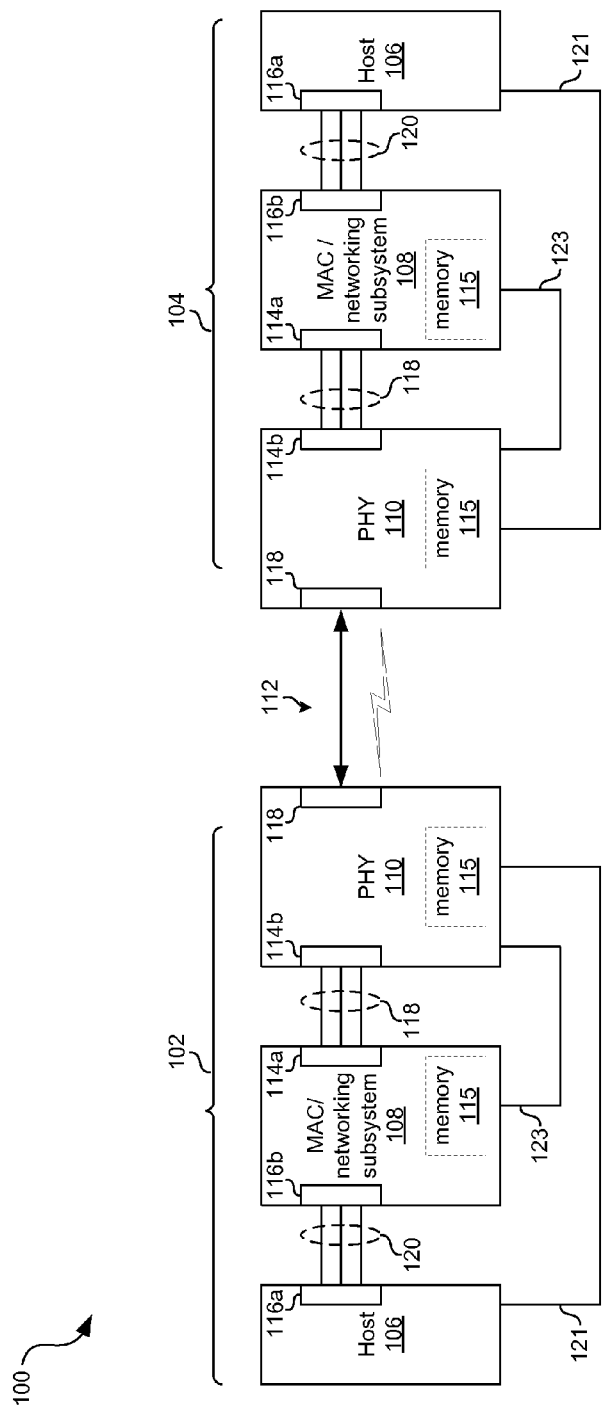
FIG. 1A is a block diagram illustrating exemplary network devices communicatively coupled via a network link, and which may be operable to utilize compensated time stamping for time-sensitive network communications, in accordance with an embodiment of the invention.

FIG. 1A is a block diagram illustrating exemplary network devices communicatively coupled, via a network link, and which may be operable to utilize compensated time stamping for time-sensitive network communications, in accordance with an embodiment of the invention. Referring to FIG. 1A, there is shown a system 100 that comprises a network device 102 and a network device 104. The network devices 102 and 104 may each comprise a host 106, a networking subsystem 108, and a PHY 110. The hosts 106 may be communicatively coupled to the networking subsystems 108 via interfaces 116a and 116b. The networking subsystems 108 may be communicatively coupled to the PHYs 110 via interfaces 114a and 114b.

The network devices 102 and 104 may be link partners that communicate via the link 112. The network device 102 and/or 104 may comprise, for example, computer systems or audio/ video (A/V) enabled equipment. In this regard, A/V equipment may, for example, comprise a microphone, an instrument, a sound board, a sound card, a video camera, a media player, a graphics card, or other audio and/or video device. Accordingly, the network devices 102 and 104 may be operable to provide guaranteed quality of service (QoS) by utilizing protocols such as IEEE 1588 and/or the Audio Video Bridging (AVB) suite of protocols (e.g. IEEE 802.1AS) for the exchange of multimedia content and associated control and/or auxiliary data.

The hosts 106 may each comprise suitable logic, circuitry, interfaces, and/or code that may enable operability and/or functionality of OSI layers 7 through 3 for packets received and/or to-be-transmitted over the link 112. The hosts 106 may each comprise, for example, one or more processing subsystems, one or more graphics subsystems, one or more audio subsystems, and one or data buses. The hosts 106 may comprise an interface 116a for communicating with a networking subsystem 108 via a bus 120. The data bus 120 may, for example, be a PCI or PCI-X bus. In some embodiments of the invention, one or more signals 121 may be provided to enable communication between the host 106 to a corresponding PHY 110.

The networking subsystems 108 may each comprise suitable logic, circuitry, and/or code that may be operable to handle functionality of OSI layer 2 and above layers in the network device 102. In this regard, networking subsystems 108 may each comprise a media access controller (MAC) and/or other networking subsystems. Each networking subsystem 108 may be operable to implement, switching, routing, and/or network interface card (NIC) functions. In this regard, each of the networking subsystems 108 may be operable to generate timestamps in accordance with protocols such as IEEE 1588 and AVB. The networking subsystem 108 may each be configured to implement Ethernet protocols, such as those based on the IEEE 802.3 standard, for example. Notwithstanding, the invention is not limited in this regard. In various embodiments of the invention, the networking subsystems 108 may be operable to determine and/or compensate for variable delays introduced by the PHYs 110. Also, the networking subsystems 108 may comprise one or more memory elements 115 for queuing received data and/or to-be-transmitted data. In some embodiments of the invention, the memory element(s) 115 of each networking subsystem 108 may also store values for parameters associated with PHY traversal time.

Each of the networking subsystems 108 may comprise and interface 116b for communicating with a host 106 via a bus 120. The interface 116b may be, for example, a PCI or PCI-X interfaces. Notwithstanding, the invention is not limited in this regard.

Each of the networking subsystems 108 may also comprise an interface 114a for communicating with a PHY 110 via a bus 118. The interface 114a may be, for example, a multi-rate capable interface and/or media independent interface (MII), a variant thereof such as XGMII, GMII, RGMII. The interface 114a may enable transmission and/or reception of one or more data signals, one or more control signals, and one or more clock signals over the bus 118. Each of the interfaces 114 may comprise a signal to indicate that data from a networking subsystem 108 to a PHY 110 is imminent on the corresponding interface 114. Such signals are referred to herein as transmit enable (TX_EN) signals. Each of the interfaces 114 may also comprise a signal to indicate that data from a PHY 110 to a networking subsystem 108 is imminent on the corresponding interface 114. Such a signal is referred to herein as a receive data valid (RX_DV) signal. The interfaces 114 may also each comprise a control interface such as a management data input/output (MDIO) interface. In some embodiments of the invention, one or more signals 123 may communicatively couple a networking subsystem 108 to a corresponding PHY 110 independent of the interfaces 114a and 114b.

The PHYs 110 may each comprise suitable logic, circuitry, interfaces, and/or code that may enable energy efficient communication between the network device 102 and the network device 104. Each of the PHYs 110 may be referred to as a physical layer transmitter and/or receiver, a physical layer transceiver, a PHY transceiver, a PHYceiver, or simply a PHY. The PHYs 110 may be operable to convert data from the networking subsystems 108 into physical layer signals for transmission over the link 112. The PHYs 110 may each comprise a medium dependent interface (MDI) 118 that may be operable to impress physical layer signals onto a physical medium.

The PHYs 110 may each support transmission and/or reception at a high(er) data in one direction and transmission and/or reception at a low(er) data rate in the other direction. For example, the PHYs 110 may each comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates. The PHYs 110 may each also support wireless protocols such as the IEEE 802.11 family of standards. The PHYs 110 may each be configured to handle physical layer requirements, which include, but are not limited to, packetization, data transfer and serialization/deserialization (SERDES), in instances where such an operation is required. Data packets received by a PHY 110 from a networking subsystem 108 may include data and header information for each of the above six functional OSI layers.

Each of the PHYs 110 may comprise suitable logic, circuitry, interfaces, and/or code that may enable communication between the network device 102 and the network device 104. Each of the PHYs 110 may be referred to as a physical layer transmitter and/or receiver, a physical layer transceiver, a PHY transceiver, a PHYceiver, or simply a PHY. The PHYs 110 may each comprise a twisted pair PHY capable of operating at one or more standard rates such as 10 Mbps, 100 Mbps, 1 Gbps, and 10 Gbps (10BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps. The PHYs 110 may each comprise a backplane PHY capable of operating at one or more standard rates such as 10 Gbps (10 GBASE-KX4 and/or 10 GBASE-KR); and/or non-standard rates such as 2.5 Gbps and 5 Gbps. The PHYs 110 may each comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. The PHYs 110 may each support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non-standard speeds and non-standard technologies, for example, single channel, two channel or four channels may also be supported. More over, TDM technologies such as PON at various speeds may be supported by each of the PHYs

110. In some embodiments of the invention, the PHYs 110 may be operable to implement MACSec protocols.

Each of the PHYs 110 may comprise an interface 114b for communicating with a networking subsystem 108 via the bus 118. The interface 114b may be, for example, a multi-rate capable interface and/or media independent interface (MII). The interface 114b may enable transmission and/or reception of one or more data signals and one or more clock signals over the bus 118. Also, the PHYs 110 may comprise one or more memory elements 115 for queuing received data and/or to-be-transmitted data. Additionally, the memory element(s) 115 of each networking subsystem 108 may be operable to store values for parameters that are associated with PHY traversal time.

Each of the PHYs 110 may be operable to implement one or more energy efficient networking (EEN) techniques. For example, the PHYs 110 may be operable to support low power idle (LPI) and/or sub-rating, also referred to as subset PHY, techniques. LPI may generally refer a family of techniques where, instead of transmitting conventional IDLE symbols during periods of inactivity, the PHYs 110 may remain silent and/or communicate signals other than conventional IDLE symbols. Sub-rating, or sub-set PHY, may generally refer to a family of techniques where the PHYs are reconfigurable, in real-time or near real-time, to communicate at different data rates.

The Ethernet link 112 is not limited to any specific medium. Exemplary Ethernet link 112 media may comprise copper, optical, backplane, and/or wireless technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the Ethernet link 112, single mode fiber as well as multi-mode fiber may be utilized. With regard to wireless, the network devices 102 and 104 may support one or more of the 802.11 family of protocols. The link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10 GBASE-T may utilize four pairs of UTP. In this regard, however, the number of physical channels via which data is communicated may vary.

In operation, each of the PHYs 110 may comprise one or more memory elements 115 for storing values for parameters associated with PHY traversal time. The PHY traversal time may be an amount of time from when data is input to a PHY 110 via a first interface until corresponding data it output by the PHY 110 via a second interface. In this regard, PHY traversal time may comprise processing time and/or propagation delays within the PHY 110. The parameters may comprise, for example, average PHY traversal time, maximum PHY traversal time, minimum PHY traversal time, and/or variance in PHY traversal time. The PHY traversal times may be formatted as, for example, per-bit, per-byte, per-symbol, and/or per-packet times. Separate parameters may be calculated for ingress and egress traffic.

The variance in the PHY traversal time may be determined based, for example, on a configuration of a PHY 110. For example, a PHY 110 may be operable to implement energy efficient networking (EEN) techniques such as low power idle and/or subset PHY. Accordingly, when the PHY 110 is operating in an energy saving mode, the PHY traversal time may be longer and when the PHY 110 is operating in a high performance mode, the PHY traversal time may be shorter. Additionally and/or alternatively, the variance in the PHY traversal time may determined based on process, temperature, and/or voltage variations.

In some embodiments of the invention, the parameters may be determined within the network devices 102 and 104. In some embodiments of the invention the parameters may be determined in a test and/or programming station and may be programmed into the PHY. In some embodiments of the invention, the parameter values may be determined for a PHY representative of a plurality of PHYs, and then the remaining ones of the plurality of PHYs may be programmed with the determined values. Additionally, parameters of a PHY 110 in the link partner 102 may be communicated to the link partner 104 via the link 112, and visa versa.

The parameter values may be utilized to, for example, determine timing characteristics of a network path. For example, the link partners 102 and 104 may utilize IEEE 1588 and may generate time stamps in the networking subsystem 108 to determine path delay of the link 112. Accordingly, the parameter values may be utilized to correct or adjust the timestamps such that the determined path delay, and thus path distance, may be more accurately determined. In this regard, without such correction or adjustment, the path delay determined utilizing the timestamps generated in the networking subsystem 108 may include PHY traversal time and not just the delay on the link 112. Therefore, if the PHY traversal time is unknown and/or variable, accuracy of the path delay determination may suffer.

Figure 1B:
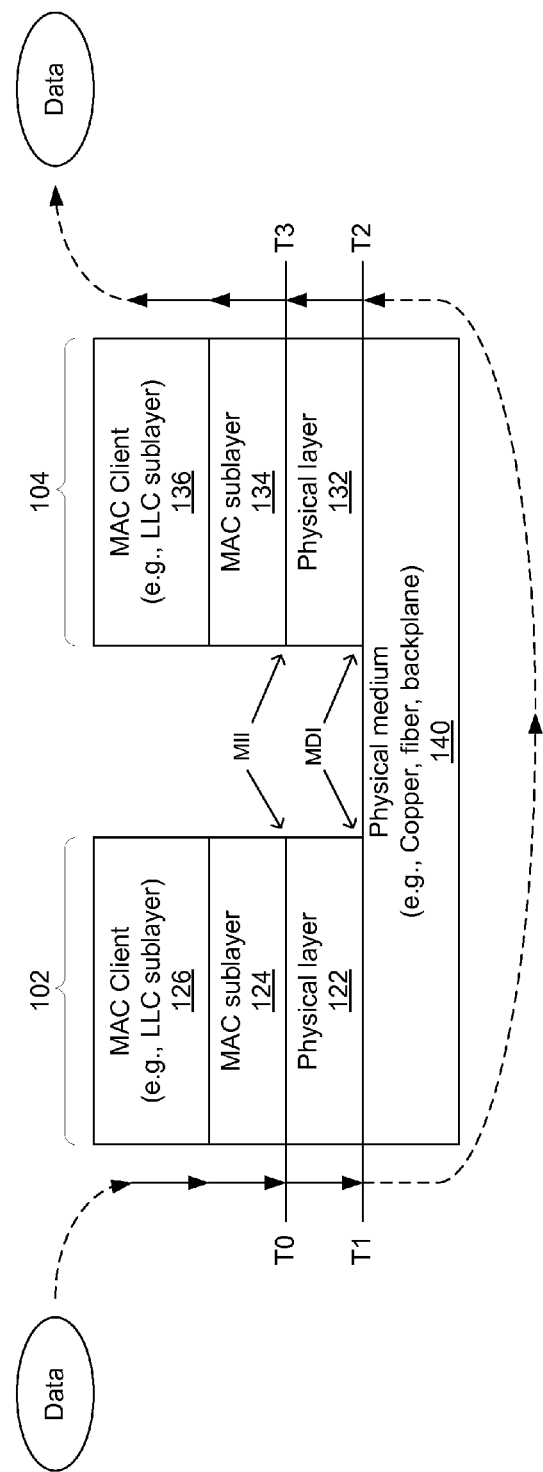
FIG. 1B is a diagram illustrating timing associated with communication of data cross a network link, in accordance with an embodiment of the invention.

FIG. 1B is a diagram illustrating timing associated with communication of data across a network link, in accordance with an embodiment of the invention. Referring to FIG. 1B, there is shown data being communicated over a physical medium 140 from the first network device 102 to the second network device 104.

The physical medium 140 may comprise copper, optical, wireless, and/or backplane media. The network devices 102 and 104 may be as described with respect to FIG. 1B. The network devices 102 and 104 may comprise MAC client sublayers 126 and 136, MAC sublayers 124 and 134, and physical layers 122 and 132, respectively. The physical layers 122 and 132 may perform functions substantially similar to the PHYs 110 described with respect to FIG. 1B.

The combination of the MAC client sublayer 126 and the MAC sublayer 124 may perform functions substantially similar to a networking subsystems 108, an interface 114, and/or an interface 116 described with respect to FIG. 1. The combination of the MAC client sublayer 136 and the MAC sublayer 134 may perform functions substantially similar to a MAC controller 108, an interface 114, and/or an interface 116 described with respect to FIG. 1. The MAC client sublayers 126 and 136 may each, for example, implement multiplexing and flow control to enable multiple network layer protocols to coexist and utilize the MAC sublayers 124 and 134 and the physical layers 122 and 132, respectively. The MAC client sublayers 126 and 136 may each be, for example, the logical link control (LLC) sub-layer defined in IEEE 802.2. The MAC sublayers 124 and 134 may each perform data encapsulation and/or media access management, where media access management may comprise operations that handle conflicts arising from multiple network devices sharing a common physical medium. An exemplary operation may comprise arbitration and negotiation.

In operation, at time instant T0, data to be transmitted may be passed from the MAC sublayer 124 to the physical layer 122. From time instant T0 to time instant T1 the physical layer 122 may process the data and convert the data into physical layer signals.

At time instant T1, the physical signals generated by the physical layer 122 may be impressed onto the physical medium 140. In this regard, $\Delta T_{OUT}=(T1-T0)$ may be the amount of time required for egress data, e.g., an egress Ethernet frame, to be processed by, and propagate through, the physical layer 122.

From time instant T1 to time instant T2, the data may propagate along the physical medium 140. At time instant T2 the data may arrive at the physical layer 132 of the network device 104. The data may be passed up to the MAC sublayer 134 at time instant t3. In this regard, $\Delta T_{IN}=(T3-T2)$ may be the amount of time required for ingress data, e.g., an ingress Ethernet frame, to be processed by, and propagate through, the physical layer 132.

In various exemplary embodiments of the invention, the network devices 102 and 104 may utilize one or more protocols, such as IEEE 1588 and/or the Audio video Bridging (AVB) suite of protocols (e.g. IEEE 802.1AS), in an attempt to accurately determine the amount of time for data to be communicated from the network device 102 to the network device 104. However, protocols such as IEEE 1588 may only be enabled to generate timestamps at the MAC sublayer—time instants T0 and T3 in FIG. 1—and thus variation in the amount of time required for data to traverse the physical layers 122 and 132 may result in inaccuracies or inconsistency in the determination of path timing. Accordingly, aspects of the invention may enable determining the PHY traversal time $\Delta T_{OUT}$ and/or $\Delta T_{IN}$ for each of the network devices. Furthermore, aspects of the invention may enable determining parameters associated with PHY traversal time. For example, one or more of: the average value of $\Delta T_{OUT}$, the average value of $\Delta T_{IN}$, the variance of $\Delta T_{OUT}$, and/or the variance of $\Delta T_{IN}$. The parameters may be stored in one or more memory elements within the PHY.

Figure 2A:
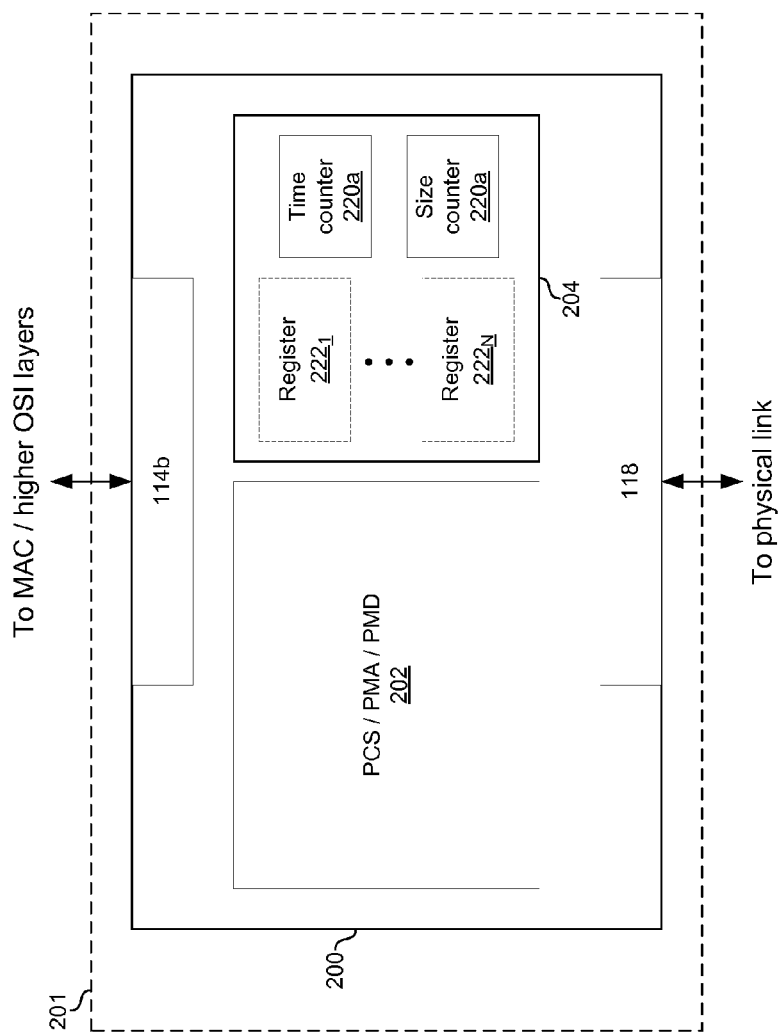
FIG. 2A is a diagram illustrating an exemplary physical layer device (PHY) operable to determine parameters associated with PHY traversal time, in accordance with an embodiment of the invention.

FIG. 2A is a diagram illustrating an exemplary physical layer device (PHY) operable to determine parameters associated with PHY traversal time, in accordance with an embodiment of the invention. Referring to FIG. 2A, there is shown a network device 201 comprising a PHY 200 which, in turn, comprises module 202, module 204, interfaces 114, and interface 118. Although the modules 202 and 204 are depicted as being separate, various functions of one or both of them may be implemented by shared logic, circuitry, interfaces, and/or code.

The network device 201 may be substantially similar to the network devices 102 and 104 described with respect to FIG. 1A. The interfaces 114b and 118 may be as described with respect to FIG. 1A.

The module 202 may comprising suitable logic, circuitry, interfaces, and or code that may be operable to perform conventional physical layer functions. In this regard, the module 202 may be operable to implement physical coding sublayer (PCS), physical medium attachment (PMA) sublayer, physical medium dependant (PMD) sublayer functions. In some instances, the module 202 may also be operable to implement a forward error correction (FEC) sublayer.

The module 204 may comprise suitable logic, circuitry, interfaces, and/or code that may enable determination of parameters associated with PHY traversal time. In this regard, the module 204 may be operable to determine the time required for ingress and/or egress data to be processed by, and/or propagate through, the sublayers and/or functions represented by the module 202. The module 204 may also be operable to determine an amount of data that is processed and/or propagates through the module 202 during a time interval.

The module 204 may comprise one or more counters 220 operable to keep track of time and/or keep track of an amount of data, e.g., frame size, traversing the PHY 200. The module 204 may additionally comprise one or more memory elements 222, e.g., hardware registers, that may be operable to store determined parameters associated with PHY traversal time. The registers may be accessible and/or configured, for example, via the interface 114, which may comprise a media independent interface or variant thereof, and/or a management data input/output (MDIO) bus.

In operation, the counters 220 may generate counts that may be utilized to calculate values for one or more parameters associated with PHY traversal time. The values for the parameters may be calculated in a networking subsystem, such as the networking subsystems 108, and/or a host, such as a host 106. The calculated values for the parameters may be stored in the one or more memory elements 222 in the PHY 200. Additionally or alternatively, the parameter values may be stored in a networking subsystem, such as the networking subsystems 108, and/or a host, such as a host 106.

In various embodiments of the invention, the memory elements 222 may be writable and the contents—the parameter values—may be configured or reconfigured during operation. In various embodiments of the invention, the memory elements 222 may be ROM and the contents may be configured during manufacture. The one or more registers 222 may store various parameters such as average egress PHY traversal time, averages ingress PHY traversal time, average variance in egress PHY traversal time, average variance in ingress PHY traversal time, PHY traversal time with MACSec enabled, PHY traversal time without MACSec enabled, PHY traversal time per bit, byte, packet, and PHY traversal time based on class of service, where classes of service may be associated with implementing AVB.

In an exemplary embodiment of the invention, a time counter 220a may count the amount of time required for a particular block of data to traverse the PHY 200 and the size counter 220b may count the size of the particular block of data. In other embodiments of the invention, the time counter 220a may count traversal time on data having a fixed or known size, e.g., maximum sized Ethernet frames. In this regard, in instances that a time count is generated for block of fixed or known size, the size counter 220b may not be necessary.

Counts generated by the time counter 220a and/or the size counter 220b may be communicated to a local networking subsystem, such as the networking subsystem s 108, and/or a local host, such as a host 106, in the form of one or more discrete control signals, as one or more packets communicated over a bus 118 and/or 120, and/or as management data communicated over a MDIO interface, which may be part of the interface 114. Additionally, the counts may be communicated in one or more packets to a remote PHY 110, networking subsystem 108, and/or host 106 via a network link 112. The parameters may be communicated to a remote PHY utilizing one or more protocols similar to, or operating as an addition to, link layer discovery protocol (LLDP).

A networking subsystem 108 and/or host 106 may be operable to utilize the time count values and size count values to calculate one or more parameters associated with PHY traversal time. In this regard, the parameters may be generated based on a time count and a size for each of one or more blocks of data. For example, several Ethernet frames of fixed, known size may be communicated during setup of a link 112 and the traversal time of each frame may be counted. The time counts for the plurality of frames along with the known size of the frames may then be utilized to determine parameters such as average PHY traversal time and variance in the PHY traversal time. In this regard, one or both of the parameters may be formatted as time-per-bit, time-per-symbol, time-per-byte, or time-per-packet.

Once the parameters values have been calculated, they may be stored to one or more memory elements 222 within the PHY device 200. The values stored in the memory elements 222 may be utilized for accurately determining path information such as path latencies, packet jitter, and path distance. In this regard, the values in the memory elements 222 may be utilized to adjust or correct timestamps generated in a MAC or higher OSI layers as part of implementing a protocol such as IEEE 1588 or related protocols such as AVB.

Figure 2B:
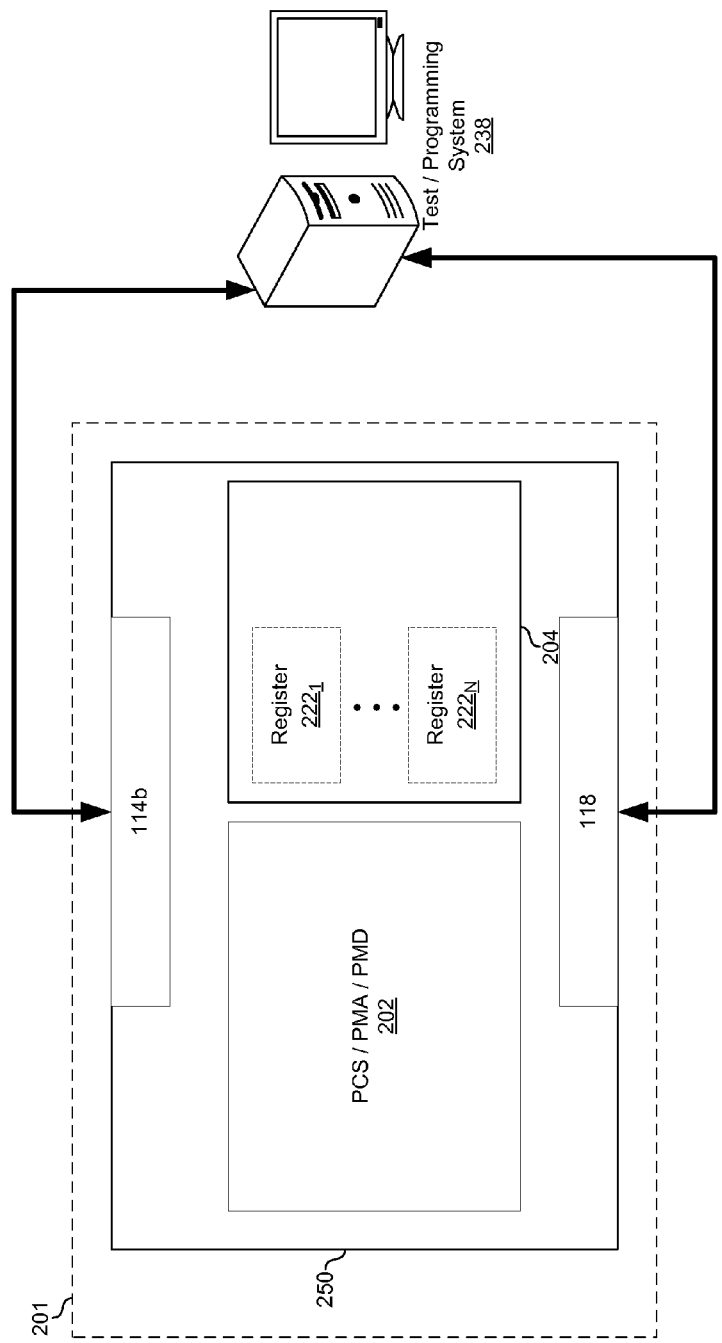
FIG. 2B is a diagram illustrating determination and/or programming of parameters associated with PHY traversal time via a test and/or programming system, in accordance with an embodiment of the invention.

FIG. 2B is a diagram illustrating determination of parameters associated with PHY traversal time via a test and/or programming system, in accordance with an embodiment of the invention. Referring to FIG. 2B there is shown a PHY device 250 which may be communicatively coupled to a test and/or programming system 238.

The PHY device 200 may be as described with respect to FIG. 2A. The network device 201 may be similar to the network devices 102 and 104 described with respect to FIG. 1A. However, the counters 220 of the PHY 200 may not be present, or may be disabled in the PHY 250. The interfaces 114 and 118 may be as described with respect to FIG. 1A.

The test and/or programming system 238 may comprise suitable logic, circuitry, interfaces, and/or code that may be operable to test and/or program the PHY 200 via the interfaces 114b and 118.

In operation, the test and/or programming system 238 may exchange data with the PHY 200 via the interfaces 114b and 118 to determine one or more parameters associated with PHY traversal time and to store the determined parameter values in the memory elements 222. For example, to determine parameters associated with ingress PHY traversal time, the test and/or programming system 238 may input physical signals into the interface 118 and may monitor the interface 114b to measure the amount of time until corresponding signals or data is output via the interface 114b. Similarly, to measure egress PHY traversal time, the test and/or programming system 238 may input data to the interface 114b and measure an amount of time until corresponding physical layer signals are output via the interface 118. After determining the parameter values, the test and/or programming system 238 may store the determined values to the memory elements 222 via. For example, the interface 114b may comprise an MDIO bus and the test and/or programming system 238 may read and write the memory elements 222 via the MDIO bus. For another example, the test and/or programming system 238 may exchange LLDPDU's with the PHY 200 via the interface 118 to configure the contents of the memory elements 222.

Figure 2C:
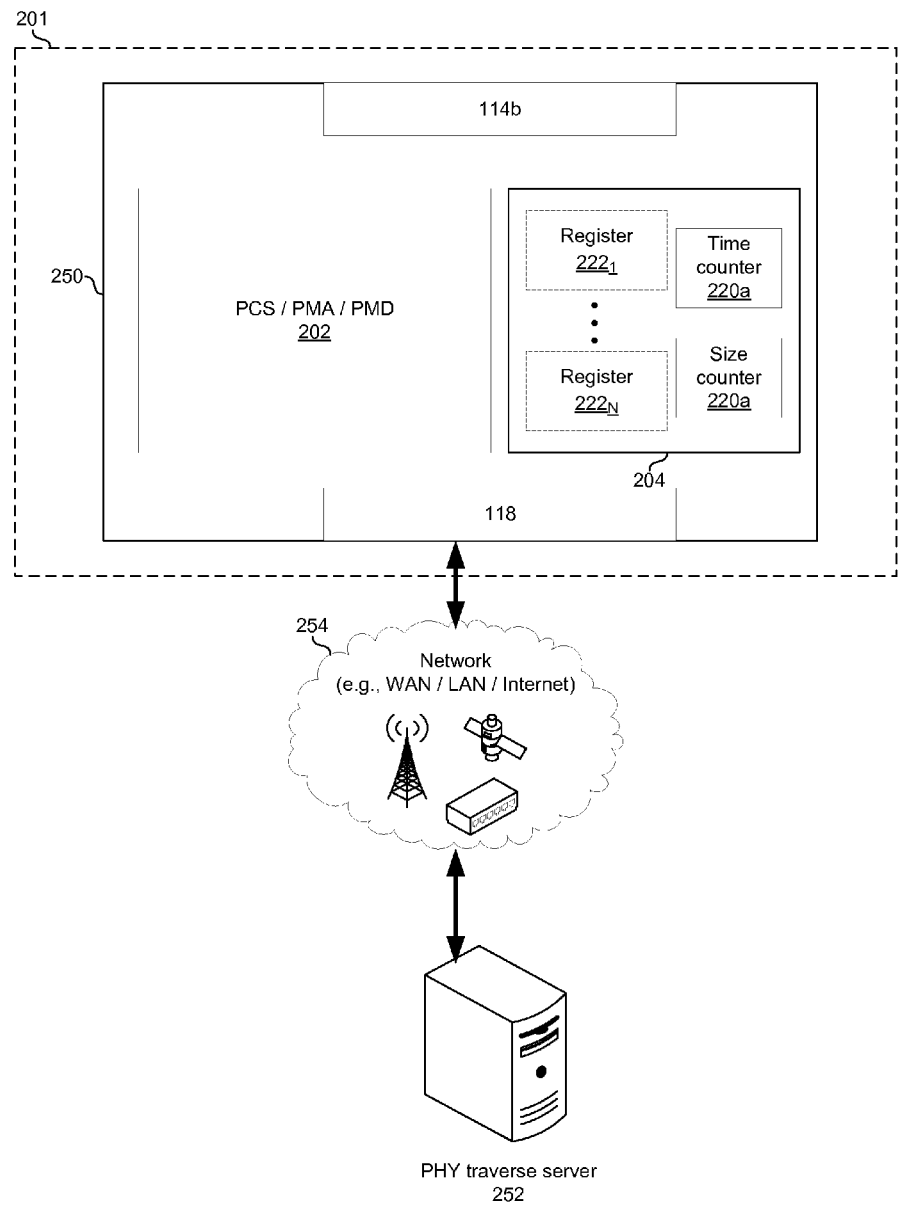
FIG. 2C is a diagram illustrating determination and/or programming of parameters associated with PHY traversal time over a network link, in accordance with an embodiment of the invention.

FIG. 2C is a diagram illustrating determination and/or programming of parameters associated with PHY traversal time over a network link, in accordance with an embodiment of the invention.

The PHY device 200 may be as described with respect to FIG. 2A, the interfaces 114 and 118 may be as described with respect to FIG. 1A. The PHY device 200 may be communicatively coupled to a network device 252 via a wired, optical, and/or wireless network 254. The network 254 may utilize one or more wired, wireless, and/or optical protocols such as Ethernet, ATM, T1/E1, T3/E3, Cellular, WiMAX, Wi-Fi, Bluetooth, PON, and SONET.

The network device 252 may comprise, for example, one or more servers and/or computing platforms. The network device 252 may be operable to exchange test data with the PHY device 200, retrieve count values from the PHY 200, calculate values for parameters associated with PHY traversal time based on the exchanged traffic and the received count values, and communicate those calculated parameter values to the PHY 200.

In an exemplary embodiment of the invention, the network device 252 may be operable to exchange test data with the PHY device 200, retrieve count values from the PHY 200, calculate parameter values based on the exchanged data and the received count values, and communicate calculated parameter values to the PHY 200. In this regard, the PHY device 200 may generate time and/or size counts and then the network device 252 may provide the processing power for calculating the parameter values. In such an embodiment of the invention, operation may be largely as described with respect to FIG. 2A.

In another exemplary embodiment of the invention, the network device 252 may comprise a server operable to store parameters for various PHY devices. In this regard, Information stored on the network device 252 may comprise data uploaded by a manufacturer, such as data measured during production and/or in test labs. Additionally or alternatively, information stored on the network device 252 may comprise and/or be based on information uploaded via the network 254 from PHY devices currently and/or previously in use in the network 254.

In operation, an identifier of the PHY device 200 may be communicated to the network device 252 and the network device 252 may respond by communicating parameter values to the PHY 200. The identifier may indicate, for example, a make, model, configuration, and/or date code of the PHY 200. The parameter values from the network device 252 may be more up-to-date than, for example, parameter values that are stored in the memory elements 222 at the time of manufacturing. In various exemplary embodiments of the invention, updated data on the network device 252 may comprise, for example, data from a characterization of one or more PHYs similar to or the same as the PHY 200. For example, another PHY from the same production run as the PHY 200 may be kept by the manufacturer and measured over time to characterize the aging of the PHYs. In various exemplary embodiments of the invention, updated data on the network device 252 may have been uploaded from the PHY 200 and/or one or more other PHYs that are similar to or the same as the PHY 200. For example, devices such as the network device 201 may periodically upload determined parameter values to the network device 252. The network device 252 may utilize the uploaded data to modify data tables which may comprise parameter values that may be subsequently downloaded to other PHYs such as the PHY 200 that are connected to the network 254.

Figure 3:
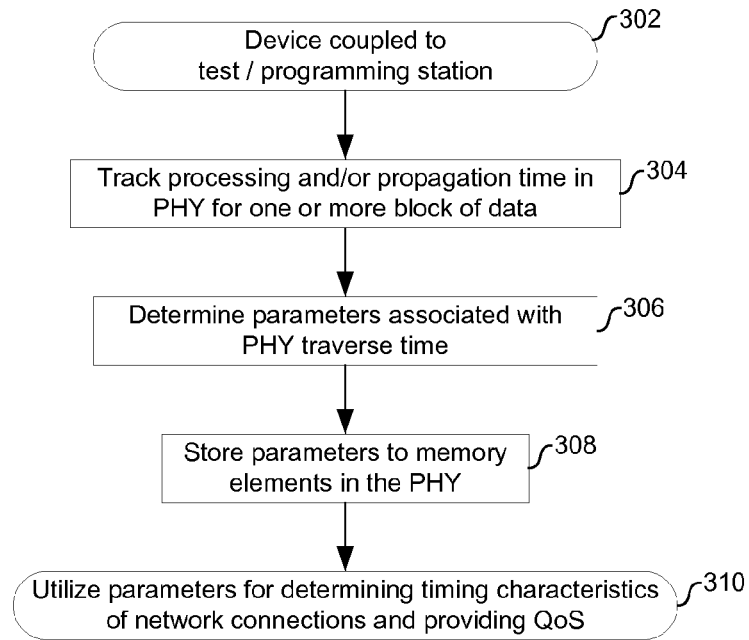
FIG. 3 is a flowchart illustrating exemplary steps for determining and utilizing parameter values for accurate characterization of a network path, in accordance with an embodiment of the invention.

FIG. 3 is a flowchart illustrating exemplary steps for determining and utilizing parameter values for accurate characterization of a network path, in accordance with an embodiment of the invention. Referring to FIG. 3, the exemplary steps may begin with step 302 when a network device, such as the network devices 102 and 104 described with respect to FIG. 1A, are powered up. Subsequent to step 302, the exemplary steps may advance to step 304.

In step 304, the amount of time between input of signals and/or data to the PHY and output of corresponding signals and/or data by the PHY may be measured. In this regard, the time may be measured utilizing one or more counters within the PHY and/or may be measured by test equipment communicatively coupled to the PHY. Subsequent to step 304, the exemplary steps may advance to step 306.

In step 306, the times measured in step 304 may be utilized, in combination with the size of the block of data for which the time was measured, to calculate values for one or more parameters associated with PHY traversal time. Exemplary parameters may comprise average ingress PHY traversal time, average egress PHY traversal time, variance in ingress PHY traversal time, and variance in egress PHY traversal time. In this regard, one or both of the parameters may be formatted as time-per-bit, time-per-symbol, time-per-byte, or time-per-packet. Subsequent to step 306, the exemplary steps may advances to step 308.

In step 308, the parameter values determined in step 306 may be stored to one or more memory elements within the PHY. In one exemplary embodiment of the invention, the values may be written via a MDIO bus. In another exemplary embodiment of the invention, the values may be stored to a memory element via one or more LLDPDU's. Subsequent to step 308, the exemplary steps may advance to step 310.

In step 310, the values for parameters stored in the PHY may be utilized to, for example, determine timing characteristics of a network link such as path delay, latency, and jitter. In an exemplary embodiment of the invention, the timing characteristics may be utilized to implement protocols such as IEEE 1588 that utilize timestamps generated in a networking subsystem, which may comprise a MAC. Accordingly, the timestamps may be adjusted or compensated based on the values for the parameters stored in the PHY. In this manner, the parameter values may enable increased accuracy of timing characteristics.

Figure 4:
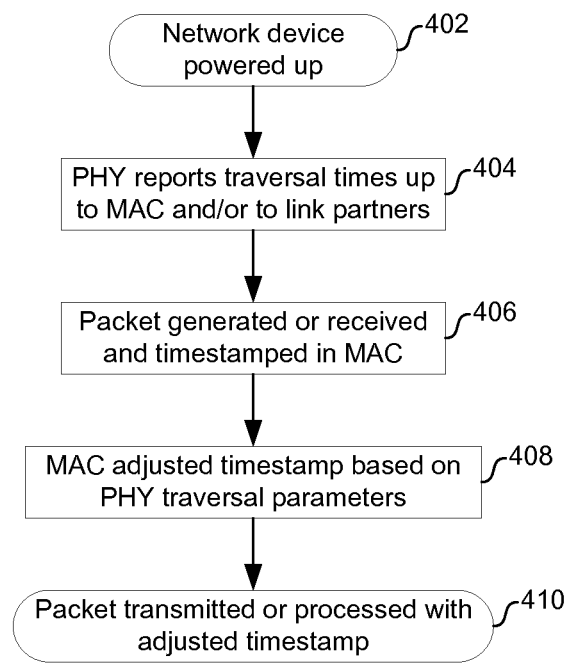
FIG. 4 is a flowchart illustrating exemplary steps for determining adjusting timestamps based on PHY traversal time, in accordance with an embodiment of the invention.

FIG. 4 is a flowchart illustrating exemplary steps for adjusting timestamps based on PHY traversal time, in accordance with an embodiment of the invention. Referring to FIG. 4, the exemplary steps may begin with step 402 when a network device, such as the network devices 102 and 104, are powered up. Subsequent to step 402, the exemplary steps may advance to step 404.

In step 404, the PHYs 110 of the network devices 102 and 104 may communicate one or more parameters associated with PHY traversal time(s) up to the MACs 108 and/or hosts 106. In this regard, the parameters may, for example, be predetermined in the PHYs 110 during manufacture and/or programmed by a network administrator. The parameters may, for example, indicate PHY traversal times for various traffic types or sizes, and/or various network conditions. The parameters may be stored in, for example, nonvolatile RAM may thus travel with that PHY 110 regardless of a network device in which the PHY 110 is installed. Subsequent to step 404, the exemplary steps may advance to step 406.

In step 406, a packet may be generated or received by a first one of the network devices 102 and 104, and the received and/or to-be-transmitted packet may be time stamped in the corresponding MAC 108 and/or the host 106.

In step 408, the timestamp generated in step 406 may be adjusted based on one or more parameters associated with PHY traversal time, where the parameters were read from one or more memory elements in the PHY 110. Subsequent to step 408, the exemplary steps may advance to step 410.

In step 410, the generated or received packet may be transmitted or processed, accordingly. In instances of transmission, the adjusted timestamp may be transmitted to the other one of the network devices 102 and 104 along with the generated packet and/or in a subsequent packet. In instances of reception, the received packet may be processed based on the adjusted timestamp.

Various aspects of a method and system for compensated time stamping for time-sensitive network communications are provided. In various embodiments of the invention, one or more timestamps generated in an OSI layer above the physical layer, such as the networking subsystem 108 of the network device 102, for example, may be adjusted based on parameters associated with an amount of time in which data traverses the PHY 110 of the network device 102. Communications with the network device 102 may be managed based on the adjusted one or more timestamps. The parameters may comprise one or more of: average ingress PHY traversal time, average egress PHY traversal time, variance of ingress PHY traversal time, and variance of egress PHY traversal time. One or both of the variance of egress PHY traversal time and the variance of ingress PHY traversal time may be based on PHY traversal time for different configurations of a PHY within the network device. One or both of the variance of egress PHY traversal time and the variance of ingress PHY traversal time may be determined based on process, temperature, and/or voltage variations. One or more network links 112 coupled to the network device 102 may be characterized based on the one or more adjusted timestamps. The parameters may be stored in one or more registers 222 within a PHY 200 of a network device 201. The one or more registers 222 may be accessible via a management data input/output (MDIO) bus. The parameters may be determined and stored in the registers 222 by a test and/or programming system 238. The one or more registers 222 may be configured via an exchange of link layer discovery protocol data units. The parameters may be determined utilizing one or more counters 220 within a PHY 200 of a network device 201.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for compensated time stamping for time-sensitive network communications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
performing by one or more circuits in a network device, one or more functions comprising:
storing, in one or more registers within a physical layer device of said network device, determined parameters associated with a traversal time of data in a single direction between a first end of said physical layer device associated with a first interface of said physical layer device with a higher layer and a second end of said physical layer device associated with a second interface of said physical layer device physical media; and
adjusting one or more timestamps generated in a layer above said physical layer device based on said stored determined parameters that are retrieved from said one or more registers within said physical layer device of said network device, said adjusting accounting for said traversal time of data in said single direction through said physical layer device due to operation of said physical layer device in an energy saving mode.

2. The method according to claim 1, further comprising determining said parameters using one or more counters in said physical layer device.

3. The method according to claim 1, further comprising determining said parameters using one or more counters in a testing system that is coupled to said physical layer device.

4. The method according to claim 1, further comprising determining said parameters using a network device that exchanges test data with said physical layer device and receives count values from one or more counters in said physical layer device.

5. The method according to claim 1, further comprising determining said parameters based on a size of a block of data that traverses said physical layer device.

6. The method according to claim 1, further comprising accessing said one or more registers via a management data input/output (MDIO) bus.

7. The method according to claim 1, wherein said timestamps are used as part of an IEEE 1588 protocol.

8. The method according to claim 1, wherein said timestamps are used as part of an audio/video bridging protocol.

9. The method according to claim 1, wherein said parameters include an average ingress physical layer device traversal time or an average egress physical layer device traversal time.

10. The method according to claim 1, wherein said parameters include variance in ingress physical layer device traversal time or variance in egress physical layer device traversal time.

11. The method according to claim 1, further comprising transmitting a packet having an adjusted timestamp.

12. A system for networking, the system comprising:
one or more circuits for use in a network device, said one or more circuits operable to:
store, in one or more registers within a physical layer device of said network device, determined parameters associated with a traversal time of data in a single direction between a first end of said physical layer device associated with a first interface of said physical layer device with a higher layer and a second end of said physical layer device associated with a second interface of said physical layer device with physical media; and
adjust one or more timestamps generated in a layer above said physical layer device based on said stored determined parameters that are retrieved from said one or more registers within said physical layer device of said network device, said adjusting accounting for said traversal time of data in said single direction through said physical layer device due to operation of said physical layer device in an energy saving mode.

13. The system according to claim 12, wherein said one or more circuits are further operable to determine said parameters using one or more counters in said physical layer device.

14. The system according to claim 12, wherein said one or more circuits are further operable to determine said parameters based on a size of a block of data that traverses said physical layer device.

15. The system according to claim 12, wherein said one or more circuits are further operable to access said one or more registers via a management data input/output (MDIO) bus.

16. The system according to claim 12, wherein said timestamps are used as part of an IEEE 1588 protocol.

17. The system according to claim 12, wherein said timestamps are used as part of an audio/video bridging protocol.

18. The system according to claim 12, wherein said parameters include an average ingress physical layer device traversal time or an average egress physical layer device traversal time.

19. The system according to claim 12, wherein said parameters include variance in ingress physical layer device traversal time or variance in egress physical layer device traversal time.

20. The system according to claim 12, wherein said one or more circuits are further operable to transmit a packet having an adjusted timestamp.

* * * * *

UNITED STATES PATENT AND TRADEMARK OFFICE
CERTIFICATE OF CORRECTION

PATENT NO. : 9,065,736 B2  Page 1 of 1
APPLICATION NO. : 13/647597
DATED : June 23, 2015
INVENTOR(S) : Diab et al.

It is certified that error appears in the above-identified patent and that said Letters Patent is hereby corrected as shown below:

In the claims,

Replace column 13, line 19 with the following corrected version:

-- of said physical layer device with physical media; and --

Signed and Sealed this
First Day of March, 2016

Michelle K. Lee
*Director of the United States Patent and Trademark Office*